US007051300B1

(12) United States Patent
Shen et al.

(10) Patent No.: US 7,051,300 B1
(45) Date of Patent: May 23, 2006

(54) METHOD AND SYSTEM FOR ARCHITECTURAL POWER ESTIMATION

(75) Inventors: Gene W. Shen, San Jose, CA (US); Stephan G. Meier, Sunnyvale, CA (US); Leslie A. Barnes, Ben Lomond, CA (US); Paul S. Keltcher, Sunnyvale, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 315 days.

(21) Appl. No.: 10/655,390

(22) Filed: Sep. 4, 2003

(51) Int. Cl.
*G06F 17/50* (2006.01)
(52) U.S. Cl. .............................................. 716/4; 716/5
(58) Field of Classification Search .................... 716/4, 716/5, 1; 703/18
See application file for complete search history.

(56) References Cited

U.S. PATENT DOCUMENTS 6,865,526 B1 * 3/2005 Henkel et al. ................ 703/18

OTHER PUBLICATIONS

Kamble et al., "Analytical Energy Dissipation Models for Low Power Caches", Aug. 1997, IEEE Symposium on Low Power Electronics and Design, Proceedings, pp. 143-148.*
Duarte et al., "Impact of Technology Scaling in the Clock System Power", Apr. 2002, IEEE Computer Society Annual Symposium on VLSI, Proceedings, pp. 52-57.*

"Wattch: A Framework for Architectual-Level Power Analysis and Optimizations", Brooks, et al, ISCA, 2000, Bancouver BC Canada, 1-58113-22-8/00/6.
"An Enhanced Access and Cycle Time Model for On-Chip Caches", Wilton, et al, Western Research Laboratory, Palo Alto, CA, Jul, 1994.
"Evaluation of Architecture-Level Power Estimation for CJMOS RISC Processors", Sato, et al, IEEE, 1995, 0 7803-3036-6/95.
"Power and Performance Simulator:ESP and its Application for 100MIPS/W Class RISC Design", Sato, et al, IEEE, 1994, 0-7803-1953-2/94.
"A Technique to Determine Power-Efficient, High-Performance Superscaler Porcessors", Conte, et al, IEEE, 1995, 1060-3425/95.

(Continued)

*Primary Examiner*—Sun James Lin
(74) *Attorney, Agent, or Firm*—Meyertons Hood Kivlin Kowert & Goetzel, P.C.; B. Noël Kivlin

(57) ABSTRACT

A method is provided for architectural integrated circuit power estimation. The method may include receiving a plurality of respective energy events, receiving a plurality of base-level energy models, and generating a plurality of power models. Each power model may hierarchically instantiate one or more of the base-level energy models. The method may further include mapping each respective energy event to one or more of the plurality of power models. The method may further include hierarchically evaluating a particular base-level energy model corresponding to a given respective energy event, estimating an energy associated with evaluation of the particular base-level energy model, and accumulating the energy in a power estimate corresponding to the given respective energy event.

21 Claims, 3 Drawing Sheets

OTHER PUBLICATIONS

"Reducing Power in High-Performance Microprocessors", Tiwari, et al, ACM, San Diego, CA, 1998, 0-897-964-5/98/06.

"Instruction-Level Power Estimation for Embedded VLIW Cores", Sami, et al, ACM San Diego, CA, 2000, 1 58114-268-9/00/5.

"Power Estimation of System-Level Buses for Microprocessor-Based Architectures: A Case Study", Fomaciari, et al, Proceedings of the 1999 IEEE International Conference on Computer Design, Oct., 1999, Austin, TX.

"System-Level Power Optimization: Techniques and Tools", Benini, et al, ACM, San Diego, CA, 1999, 1-58113-133-X/99/0008.

"Architectural Level Hierarchical Power Estimation of Control Units", Chen, et al, IEEE, 1998, 0-7803-4980-6/98.

"Microprocessor Power Estimation Using Profile-Driven Program Synthesis", Hsieh, et al, IEEE, 1998, 0278-0070/98.

* cited by examiner

METHOD AND SYSTEM FOR ARCHITECTURAL POWER ESTIMATION

BACKGROUND OF THE INVENTION

1. Field of the Invention

This invention relates to integrated circuit design methodologies and, more particularly, to methodologies for architectural power estimation.

2. Description of the Related Art

Improvements in integrated circuit manufacturing technology have resulted in steady and dramatic increases in integrated circuit performance, particularly in terms of clock speeds. Historically, microprocessor clock speeds have doubled every two to three years, and feature size reductions have enabled the number of devices per unit of circuit area to keep pace. However, such advances have come at the cost of similarly dramatic increases in integrated circuit power consumption. Increases in clock speeds have not been offset by decreases in operating voltage and total circuit size. Further, to achieve higher clock speeds, faster transistor designs are frequently employed, which offer increased switching speed at the expense of increased leakage current (i.e., power consumed even when the transistor is not switching).

Increased integrated circuit power consumption directly affects the cost of building a system including such circuits. As power consumption increases, more costly cooling systems such as larger fans, heat sinks, and refrigeration must be employed to remove excess heat from the system and prevent integrated circuit failure. However, intense system price competition in high-volume market segments often limits the budget available for cooling systems. Increasingly, integrated circuits are at risk of becoming thermally constrained—forced to run at less than their designed operating frequency due to an inability to sufficiently cool the circuit at that frequency.

Given a particular clock frequency design goal and a particular design process voltage, power consumption can only be mitigated through careful integrated circuit design. For example, circuit structures unused during a given clock cycle may be disabled, and the global integrated circuit floorplan may be optimized to reduce the lengths (and thus the total capacitance) of wide buses. However, accurately estimating the impact of such approaches on actual circuit power consumption is difficult. Current techniques for power estimation require detailed circuit schematics, design code (such as register transfer language (RTL) code), and a floorplan from which to extract circuit geometries and bus lengths. Current power estimation tools are slow due to the amount of design detail they must take into account, which consequently limits the number of representative execution workloads that can be analyzed to assess power consumption.

As a result, for current techniques power estimation occurs very late in the integrated circuit development cycle, after a substantial amount of design work has been completed. Further, the accuracy of current techniques of power estimation is constrained by the limited amount of analysis that can be performed, increasing the risk that the effect of some power-intensive workloads may be overlooked. Consequently, integrated circuit architects and designers do not have the opportunity to analyze and select the appropriate design tradeoffs and optimizations at the beginning of the development cycle, when rework is least expensive. Current power estimation techniques result in longer development cycles, increased design resource requirements, and increased risk that an integrated circuit may not meet its design and marketing goals, all contributing to the expense of the integrated circuit design process.

SUMMARY OF THE INVENTION

Various embodiments of a method for architectural integrated circuit power estimation are disclosed. In one embodiment, the method may include receiving a plurality of respective energy events, receiving a plurality of base-level energy models, and generating a plurality of power models. Each power model may hierarchically instantiate one or more of the base-level energy models. The method may further include mapping each respective energy event to one or more of the plurality of power models.

In one specific implementation, the method may further include hierarchically evaluating a particular base-level energy model corresponding to a given respective energy event, estimating an energy associated with evaluation of the particular base-level energy model, and accumulating the energy in a power estimate corresponding to the given respective energy event.

Figure 1:
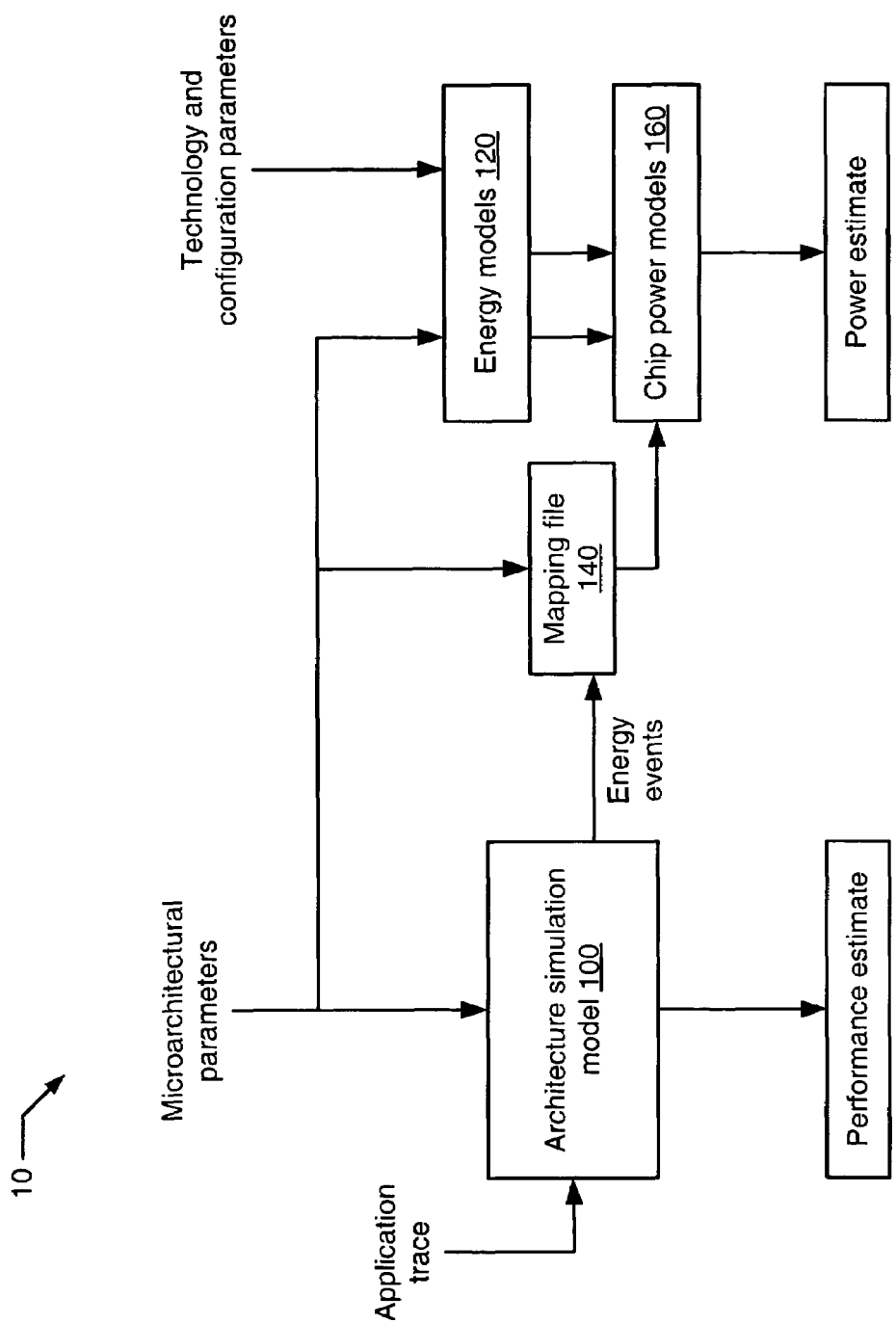
FIG. 1 is a block diagram illustrating one embodiment of a methodology for estimating power consumption in an integrated circuit.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Power Estimation Methodology

Turning now to FIG. 1, a block diagram illustrating one embodiment of a methodology for estimating power consumption in an integrated circuit is shown. Methodology 10 includes an architecture simulation model 100 configured to receive architectural parameters and an application trace and to produce a performance estimate as well as energy events. Methodology 10 also includes a plurality of energy models 120 configured to receive technology and configuration parameters. Mapping file 140 is configured to receive energy events from architecture simulation model 100 to be mapped onto a plurality of chip power models 160. Chip power models 160 are configured to receive energy models 120 and to produce a power estimate.

Architecture Simulation Model

Architecture simulation model 100 may include a microarchitecture performance model of an integrated circuit, such as an Athlon™ microprocessor, for example. Such a performance model may include high-level representations of various microarchitectural features of an integrated circuit, such as caches, register files, and execution units, for example. Further, a microarchitecture performance model may include representations of how such microarchitectural features are interconnected and their relative operational latency. Architecture simulation model 100 is configured to receive microarchitectural parameters such as cache line size, cache associativity, number of functional units, and branch misprediction penalties, for example. Such parameters may allow rapid reconfiguration of the features represented in the model.

Architecture simulation model 100 is also configured to receive an application trace. In one embodiment, such a trace may include machine readable instructions and may represent all or a portion of a computer program, such as an operating system, a software benchmark program, or an application program, for example. Architecture simulation model 100 may be configured to model (i.e., simulate the execution of) the received application trace given the received microarchitectural parameters and to collect performance events during such modeling, such as instances of cache accesses, cache hits, branch mispredictions, and particular execution unit operations, for example. Using such collected events, architecture simulation model 100 may produce a performance estimate for a given microarchitectural configuration, including metrics such as cache hit rates, instructions executed per unit of time, and total units of time per trace, for example. Architecture simulation model 100 may thereby enable integrated circuit designers to experiment with various microarchitectural configurations and tune implementation decisions to the simulated performance of a desired set of application traces, prior to committing substantial design resources to implementation of a particular microarchitectural configuration.

In addition to performance events, architecture simulation model 100 is also configured to produce energy events. As used herein, an energy event refers to an event occurring during modeling of an application trace, which event corresponds to an aspect of integrated circuit operation that consumes energy. For example, a given application trace may include a load operation that generates a load event during modeling. In terms of integrated circuit operation, a load operation may include activating an address generation unit to produce a load address as well as activating a cache to access data, each of which consumes energy. A load event may thus be an energy event.

It is noted that, depending on modeling convention, an energy event may be configured to correspond to positive (i.e., accumulated) or negative (i.e. subtracted) energy. For example, in one embodiment an initial estimate of zero load-related energy consumption may be assumed prior to the occurrence of any load energy events, which may remain zero in the absence of load energy events. Each occurrence of a load energy event may then contribute a positive energy estimate to the total energy consumed during a period of measurement. In contrast, in one embodiment an initial estimate of clock-related energy consumption may be a fixed positive value prior to the occurrence of any clock energy events, which may remain constant in the absence of clock energy events. Each occurrence of a clock energy event may then contribute a negative energy estimate to the total energy consumed during a period of measurement. Thus, in these embodiments, load energy may be regarded as accumulating from zero, while clock energy may be regarded as a fixed value unless modulated (e.g. by disabling a clock).

Many of the performance events produced by architecture simulation model 100 may correspond to energy events, and many microarchitectural configuration parameters that affect integrated circuit performance may correspondingly affect integrated circuit energy consumption. For example, cache size and the number of functional units implemented may influence cache hit rate and instruction throughput respectively, with a corresponding effect on integrated circuit performance. Additionally, cache size and the number of functional units implemented may influence the energy associated with activating these features. However, some microarchitectural features may be directed specifically towards reducing energy consumption and may have negligible impact on performance. For example, a cache energy filter structure may be included in the integrated circuit microarchitecture to reduce the energy consumption associated with cache access operations. Such a filter may include a small buffer including a plurality of entries, each of which is checked against an incoming cache access operation. If data corresponding to the cache access operation is present in the buffer, the cache access may be satisfied from the buffer and the main cache array may not be activated, thus reducing energy consumption. Operation of such a filter may not impact the critical path of the cache access operation and thus may not be significant as a performance event. However, the filter's operation may be significant as an energy event. Therefore, architecture simulation model 100 may produce energy events in addition to those energy events that correspond to performance events.

Energy and Power Models

As described above, architecture simulation model 100 may include abstract performance representations of various microarchitectural features configured to estimate the performance of an integrated circuit including such features. It may be desirable to include abstract energy representations of such microarchitectural features to estimate the power consumption of an integrated circuit including such features. Therefore, methodology 10 includes a plurality of energy models 120 and a plurality of chip power models 160, each described in further detail below.

In a given integrated circuit design, many individual logic circuits may fall into one of several broad circuit categories, such as random access memories (RAMs), read-only memories (ROMs), register files, content-addressable memories (CAMs), input/output (I/O) drivers, buses, standard cells (e.g., random synthesized logic), and custom logic circuits (e.g., clock drivers), for example. Each circuit category may include one or more base-level circuits. As used herein, a base-level circuit refers to a fundamental circuit type representative of one or more instances of that circuit, which circuit type is nonhierarchical for the purposes of energy modeling. A base-level circuit may be instantiated by itself or may be included as part of a hierarchy of circuit elements. For example, the RAM circuit category may include a base-level static RAM (SRAM) array circuit as well as a cache circuit that instantiates multiple instances of the base-level SRAM array circuit (e.g., as a data array and a tag array).

It is noted that a base-level circuit may itself include circuit hierarchy; for example, the base-level SRAM array circuit may include subarrays, buses, transistors, and other structures. However, representing detailed circuit structure in a power estimation methodology such as methodology 10 may require considerable effort relative to the precision gained. Further, during early-stage design when various microarchitectural configurations are still being evaluated, detailed information on circuit structure may not be available. Therefore, the base-level circuit may serve as a fundamental, nonhierarchical element for the purposes of energy modeling.

Energy models 120 may include a plurality of base-level energy models. As used herein, a base-level energy model refers to an abstract representation of the energy consumption of a corresponding base-level circuit. Characteristics of base-level energy models are described in greater detail below, and specific examples are described below in conjunction with the description of FIG. 3.

When a base-level energy model is evaluated, it may provide an estimate of the energy consumed by a corresponding base-level circuit during circuit operation. The energy estimate may correspond to dynamic energy consumption (i.e., energy consumed while the circuit is operating), idle energy consumption (i.e., energy consumed while the circuit is clocked, but not performing a specific operation), static energy consumption (i.e. energy consumed while the circuit is quiescent and its clocks are disabled, also referred to as leakage), or a combination of these. For example, in one embodiment, a base-level energy model may provide an energy estimate corresponding to idle energy consumption whenever it is evaluated and no active circuit operation is specified, whereas such a model may provide an energy estimate corresponding to dynamic energy consumption whenever it is evaluated and a particular circuit operation is specified.

In one embodiment, the energy estimate may be obtained by estimating the physical configuration and/or device characteristics of the base-level circuit and applying the appropriate technology parameters, each shown as inputs to energy models 120 in FIG. 1. For example, a base-level SRAM energy model may assume an approximate area per bit of storage, and use this area coupled with wire and transistor unit capacitance parameters to provide an energy estimate for a base-level SRAM circuit comprising a given number of bits. In an alternative embodiment, the energy estimate may be obtained by extracting actual electrical data from a previously completed design and scaling such data to correspond to the manufacturing process to be used. For example, the electrical characteristics of a base-level SRAM circuit completed for a previous design may be extracted either from detailed circuit schematics or from actual silicon. A base-level SRAM energy model may then use the extracted electrical data as the basis for energy estimation, scaling the extracted data based on the desired SRAM size as well as any differences in technology characteristics between the process used for the previous design and the process planned for the current design.

In one embodiment, a base-level energy model may include a plurality of parameters configured for selecting physical energy model characteristics. As used herein, a physical energy model characteristic refers to an aspect of an energy model that varies according to the value of some physical quantity. For example, the energy consumption of a base-level bus interconnect circuit may vary based on the length of the bus, the width of each wire in the bus, and the total number of wires comprising the bus. Thus a base-level bus interconnect energy model may include parameters for physical energy model characteristics corresponding to bus length, wire width, and wire count, for example.

While the area of a given circuit can always be determined from its length and width, during early stages of integrated circuit design specifying circuit dimensions in terms of length and width may be too inflexible for estimation and planning purposes. Rather, a total area budget for a given base-level circuit may be used in conjunction with an estimate of the aspect ratio of the circuit (i.e. the ratio of the circuit's length to its width). However, given a fixed area, the energy consumption of a given base-level circuit may change dramatically as its aspect ratio varies, due to factors such as the changing lengths of critical buses internal to the circuit. Therefore, in one embodiment, a base-level energy model for such a circuit may include an aspect ratio and/or an area parameter corresponding to the respective physical energy model characteristic and configured for scaling the energy estimate provided by the base-level energy model according to the parameter value.

In one embodiment, a base-level energy model may include a plurality of parameters configured for selecting microarchitectural energy model characteristics. As used herein, a microarchitectural energy model characteristic refers to an aspect of an energy model that varies according to some microarchitectural feature. For example, the energy consumption of a base-level SRAM circuit may vary based on the width and number of its read and write ports, as well as how the circuit is organized with respect to logical lines and columns. Thus a base-level SRAM energy model might include parameters for microarchitectural energy model characteristics corresponding to port number, port width, total number of bits of storage, and logical line size, for example.

Certain types of base-level circuits may consume varying amounts of energy depending on their mode of operation. For example, a base-level SRAM circuit may consume different amounts of energy depending on whether it is idle, being read, or being written. Similarly, a base-level random logic circuit may consume different amounts of energy depending on its switching factor (i.e., the percentage of gates switching logical output state at any given time, on average). Therefore, in one embodiment, a base-level energy model may include a plurality of parameters configured for selecting the operation mode and/or switching factor of the modeled circuit.

Similar to the operation mode-dependent energy consumption described above, certain types of base-level circuits may consume varying amounts of energy depending on a data value provided to the circuit, owing to differing numbers of gates and devices switching logical output state for different data values. For example, a base-level adder circuit may consume different amounts of energy depending on whether its input operands constitute all logical zeros, all logical ones, or a combination of logical zeros and logical ones. Therefore, in one embodiment, a base-level energy model may include a data value parameter configured for scaling the energy estimate provided by the base-level energy model according to the parameter value.

With any parameterized energy model, the possibility exists that a user could provide a parameter value that exceeds the range over which the energy model can provide a reliable energy estimate. For example, a model user could attempt to instantiate a base-level SRAM energy model with both a total size and a logical line size of one gigabyte. Such an SRAM organization, if it could be constructed at all, would be suboptimal in the extreme. Therefore, in one embodiment, a base-level energy model may include a means for performing limit or valid range testing on various input parameters in order to provide feedback to the user when specious or out-of-range parameters are specified.

As noted above, energy models 120 may correspond to commonly used basic circuits in an integrated circuit design. A given circuit may include a number of different base-level circuits in a hierarchical fashion. For example, a cache circuit may hierarchically include several base-level SRAM array circuits corresponding to tag and data arrays as well as several base-level bus interconnect circuits corresponding to data fill and read paths. Such a design approach may be advantageous in that it may enable such base-level circuits to be reused multiple times within different circuits with minimal modification. Correspondingly, the base-level energy models of energy models 120 may be hierarchically instantiated by chip power models 160 to generate power models for more complex circuit structures. As used herein, a chip power model refers to an abstract representation of the energy or power consumption of a corresponding hierarchical circuit. A chip power model may also be referred to simply as a power model.

A given chip power model 160 may instantiate only one base-level energy model, or may instantiate more than one base-level energy model. As described above, in various embodiments a given base-level energy model may include various parameters defining physical energy model characteristics, microarchitectural energy model characteristics, or other such features. When instantiating such a base-level energy model, a given chip power model 160 may define such parameters internally as constants, or may pass such parameters through as chip power model parameters. For example, it may be desirable to use a single cache power model for each of several cache circuits in an integrated circuit design. Each such cache circuit may include the same number of base-level SRAM circuits and base-level bus interconnect circuits and may use the same logical line size, but the cache size and number of ways used by each cache circuit may differ. In such an example, the cache power model may instantiate the appropriate number of base-level SRAM energy models and base-level bus interconnect energy models, specifying the logical line size parameter of the SRAM energy models as a constant, but passing through the cache size and number of ways as parameters of the cache power model. The cache power model may then be instantiated several times with the parameters corresponding to the various cache circuits to be modeled. It is noted that any given chip power model may include an arbitrary number of levels of hierarchy. Specific examples of power model generation and instantiation are described below in conjunction with the description of FIG. 3.

It is noted that the electrical power (measured in Watts, W) consumed by a circuit is equivalent to the electrical energy (measure in Joules, J) consumed by that circuit over a period of time. In an integrated circuit embodiment that includes a clock signal, it may be desirable to normalize power consumption relative to one clock cycle. For modeled operations that occur during a single clock cycle, energy and normalized power quantities are thus identical, and normalized power (Joules/cycle) may be easily converted into Watts by multiplying normalized power by the clock frequency (cycles/second). For modeled operations that occur over a span of multiple clock cycles, in one embodiment the relevant power model may simply report the total energy consumed by the entire operation as a single power value normalized to a single clock cycle. In another embodiment, the relevant power model may average the total energy consumed by the entire operation over the total number of clock cycles and return one power value per clock cycle. In yet another embodiment, the relevant power model may be cycle-accurate across multiple cycle operations, returning one power value per clock cycle that approximates the actual power consumed during each clock cycle, without averaging.

Mapping File and Power Estimation

The energy events produced by architecture simulation model 100 may be mapped to one or more of the plurality of chip power models 160 by mapping file 140. In one embodiment, mapping file 140 may include the instantiation of particular chip power models and the specification of parameters of instantiated power models, as such parameters are described in the previous section. Additionally, mapping file 140 may include the definition of specific mappings between each of a plurality of energy events and one or more corresponding power models. For example, mapping file 140 may include the instantiation of power models corresponding to an instruction cache, a first-level data cache, and a second-level data cache. Mapping file 140 may also map an instruction fetch energy event to the instruction cache power model, a first-level data cache access energy event to the first-level data cache power model, and a second-level data cache access energy event to the second-level data cache power model.

In one embodiment, a single mapping file may include all power model instantiations and energy event mappings defined for use in methodology 10. In an alternative embodiment, several mapping files may be used; as an example, one mapping file may be used for models and energy events related to instruction fetch and decode, while another may be used for models and energy events related to instruction execution and cache accesses. Specific examples of instantiating power models and mapping energy events are described below in conjunction with the description of FIG. 3.

As described in greater detail below in conjunction with the description of FIG. 2, mapping file 140 may be used in conjunction with the other elements of methodology 10 to estimate power consumption of an integrated circuit. Energy events produced during the course of execution of architecture simulation model 100 may evaluate particular power models as specified by mapping file 140. The results of such evaluation may be accumulated to form a power estimate for a given simulated clock cycle of an integrated circuit.

It is noted that any or all of the elements of methodology 10 illustrated in FIG. 1 may be implemented in software, hardware, or a combination of both. In one embodiment, each element of methodology 10 may be implemented in the C++ programming language, compiled, and run as one or more application programs on a computer system. In another embodiment, one or more elements of methodology 10 may be implemented in a hardware description language such as Verilog RTL and compiled to run on a hardware-based emulation system such as a Quickturn™ system or synthesized onto a collection of programmable logic devices. Other embodiments are contemplated in which various combinations of hardware and software are used to implement the elements of methodology 10.

Operation of Methodology

Figure 2:
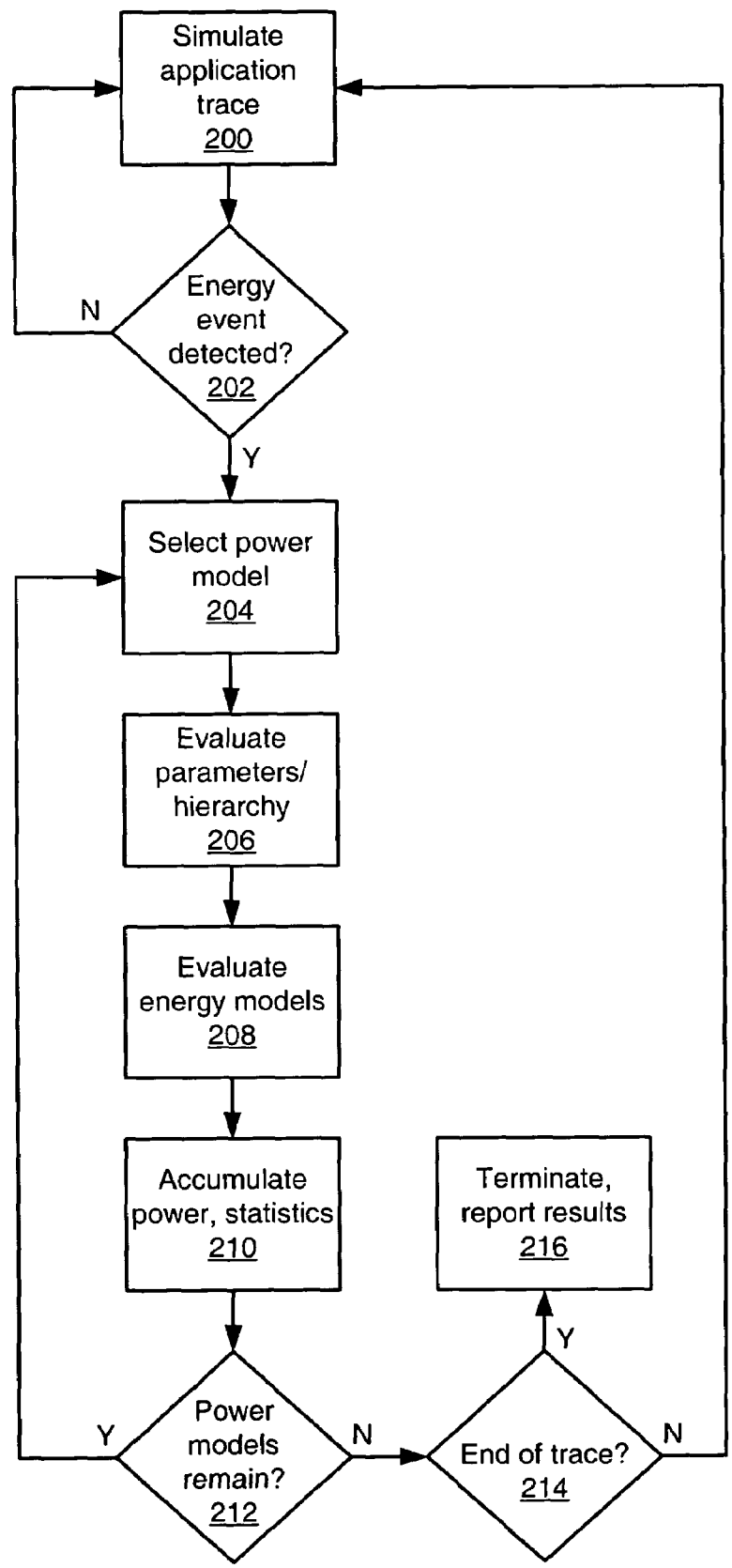
FIG. 2 is a flow diagram illustrating operation of one embodiment of a methodology for estimating power consumption in an integrated circuit.

Turning now to FIG. 2, a flow diagram illustrating operation of one embodiment of a methodology for estimating power consumption in an integrated circuit is shown. Referring collectively to FIG. 1 and FIG. 2, operation begins in block 200 where architecture simulation model 100 is simulating the execution of a particular application trace. In the course of simulating a given execution cycle of the application trace, architecture simulation model 100 determines whether an energy event has been detected (block 202). For example, architecture simulation model 100 may detect that a read access to the instruction cache has occurred. If no energy event is detected, simulation of the application trace proceeds (block 200).

If an energy event is detected, architecture simulation model 100 may reference mapping file 140 to determine which instantiation of chip power models 160 corresponding to the detected energy event is to be evaluated (block 204). For example, in response to the instruction cache read access energy event previously detected, an instruction cache data array power model may be selected. The parameters corresponding to the selected power model may then be evaluated, and the hierarchy of the power model traversed to ascertain the base-level energy models instantiated in the power model (block 206). For example, mapping file 140 may instantiate the instruction cache data array power model with certain parameters specifying the instruction cache size and number of ways. These parameters may be evaluated, and the hierarchy of the instruction cache data array power model traversed to identify its constituent base-level energy models, such as instances of base-level SRAM array and bus interconnect energy models, for example.

Once the base-level energy models instantiated by the selected power model have been identified, they may be evaluated using parameters passed from higher levels of hierarchy, and the energy associated with such energy model evaluation may be estimated (block 208). For example, an instance of a base-level SRAM array energy model included in the instruction cache data array power model may be evaluated using parameters defining a particular array size and logical line size as well as specifying a read operation, and the energy consumed by the base-level SRAM array energy model for this parameters may be estimated. It is noted that in one embodiment, the power models and base-level energy models may be implemented using object-oriented software techniques wherein hierarchy traversal functions and energy model evaluation may be implemented as methods of energy model objects. In such an embodiment, hierarchy traversal as described in block 206 and energy model evaluation as described in block 208 may occur as one step or may occur as alternating, iterative steps depending on the implementation of the methods.

It is noted that in an alternative embodiment, the base-level energy models corresponding to a given power model may be identified before a simulation is initiated, and energy estimates corresponding to all or a subset of the parameter permutations of the given power model and its corresponding base-level energy models may be precomputed for various energy events. For example, prior to initiating a simulation, microarchitectural parameters of a cache power model such as cache size, number of ways, and line size may be specified. Energy estimates for a cache read operation, a cache write operation, and a cache idle operation, for example, may then be precomputed prior to simulation initiation. In such an embodiment, when a power model is selected during simulation as described above in block 204, the precomputed energy estimate corresponding to the particular detected energy event may be selected, and operation may proceed directly to block 210, thereby potentially decreasing simulation computation time.

After the energy associated with the evaluation of the instantiated base-level energy models has been estimated, it may be accumulated in a power estimate corresponding to the energy event first detected in block 202. Additionally, other statistics associated with the energy event may be recorded, such as the current clock cycle being simulated and the operation mode of the energy event (e.g., read, write), for example (block 210). Mapping file 140 may then be referenced to determine if additional power models are associated with the detected energy event (block 212). If additional power models are defined, operation continues from block 204 wherein another power model is selected to be evaluated. If no additional power models are defined, architecture simulation model 100 may determine whether the end of the application trace has been reached (block 214). If the end of the application trace has not been reached, operation proceeds to block 200 where trace simulation continues. If the end of the application trace has been reached, operation terminates, and performance and power statistics gathered during simulation may be processed and reported (block 216). It is noted that in an alternative embodiment, performance and power statistics gathered during simulation may be processed and reported on a periodic basis while simulation proceeds, such as on a per-cycle basis, for example.

Instruction Cache Modeling Example

Figure 3:
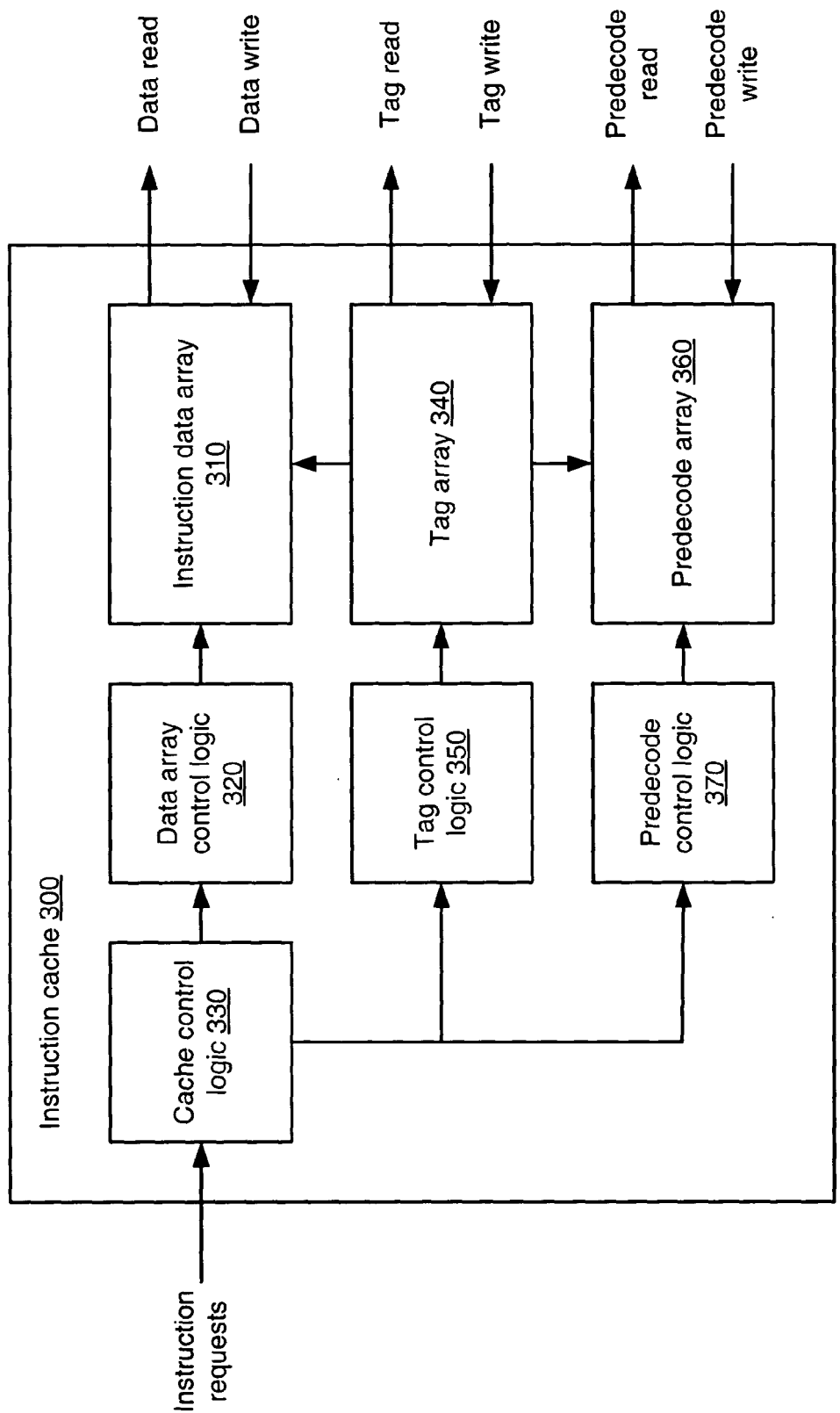
FIG. 3 is a block diagram illustrating one embodiment of an instruction cache.

Turning now to FIG. 3, a block diagram illustrating one embodiment of an instruction cache is shown. In the illustrated embodiment, instruction cache 300 includes instruction data array 310 coupled to data array control logic 320 and to data read and write buses, tag array 340 coupled to tag control logic 350 and to tag read and write buses, and predecode array 360 coupled to predecode control logic 370 and to predecode read and write buses. Tag array 340 is also coupled to instruction data array 310 and predecode array 360. Instruction cache 300 also includes cache control logic coupled to receive instruction requests and coupled to data array control logic 320, tag control logic 350, and predecode control logic 370.

Instruction data array 310 may include one or more SRAM arrays configured to store instruction data received from the data write bus and to retrieve instruction data through the data read bus in response to instruction requests received by instruction cache 300. Data array control logic 320 may include control logic configured to coordinate reads and writes of instruction data array 310.

Predecode array 360 may include one or more SRAM arrays configured to store predecoded instruction data received from the predecode write bus and to retrieve predecoded instruction data through the predecode read bus in response to instruction requests received by instruction cache 300. In one embodiment, such predecoded instruction data may include the estimated length of each instruction stored in the instruction data array, for example. Predecode control logic 370 may include control logic configured to coordinate reads and writes of predecode array 360.

Tag array 360 may include one or more SRAM arrays configured to store cache tag data received from the tag write bus and to retrieve cache tag data through the tag read bus in response to instruction requests received by instruction cache 300. In one embodiment, instruction cache 300 may be a set-associative cache, and tag array 360 may be configured to determine which way of instruction data array 310 and predecode array 360 should be selected in response to a cache hit. In such an embodiment, tag control logic 350 may include control logic configured to coordinate reads and writes of tag array 340. Additionally, tag control logic 350 may be configured to determine which way of data array 310, tag array 340, and predecode array 360 is to be selected in the event of an array write, for example in accordance with a least-recently-used replacement policy.

Cache control logic 330 may include control logic configured to coordinate operation of data array control logic 320, tag control logic 350, and predecode logic 370, as well as other aspects of instruction cache 300 operation (not shown) in response to receiving an instruction request.

It may be desirable to estimate the power consumption of instruction cache 300 utilizing methodology 10 of FIG. 1. To do so, base-level energy models, power models, and a mapping of energy events to power models may be defined. In one embodiment, the base-level energy models used to model instruction cache 300 may include an SRAM array energy model, a bus interconnect energy model, and a standard cell energy model.

Base-Level Energy Model Examples

One embodiment of code implementing a base-level SRAM array energy model may be configured as follows:

```
//****************************************************************************************************
// SRAM energy model
//****************************************************************************************************
c_sramModule::c_sramModule(const string $x_name, c_physModule*x_par,
            const uInt32 p_width, const uInt32 p_rows,
            const uInt32 p_readWidth,const uInt32 p_writeWidth) :
            c_physModule(x_name, x_par) {
    // Parameter bounds checking
    ASSERT(p_width<=320,assert::e_warn,"SramModule model " << x_name << " invoked with Width > 320");
    ASSERT(p_rows<=130,assert::e_warn,"SramModule model " << x_name << " invoked with Rows > 128");
    ASSERT(p_rows>=4,assert::e_warn,"SramModule model " << x_name << " invoked with Rows < 4");
    ASSERT(p_width>=16,assert::e_warn,"SramModule model " << x_name << " invoked with Width < 16");
    ASSERT(p_readWidth<=280,assert::e_warn,"SramModule model " << x_name << " invoked with ReadWidth > 280 " << p_readWidth );
    ASSERT(p_writeWidth<=280,assert::e_warn,"SramModule model " << x_name << " invoked with WriteWidth > 280 " << p_writeWidth );
    m_width = p_width;
    m_rows = p_rows;
    m_readWidth = p_readWidth;
    m_writeWidth = p_writeWidth;
    m_physType = e_physTypeMacro;
    m_physSubType = e_physSubTypeSRAM;
}
// Return dynamic energy cost for an access event to SRAM
// Energy is modelled as follows:
// —> wordline capacitance (all access types)
//          ( ) total columns scaled by the wline wire cap
//          ( ) gate cap per bit cell on wline
// —> bitline energy (customized per access type)
//          ( ) per row energy cost                        (read,write)
//          ( ) fixed cost for pre-charge, col circuitry, sense    (read,write)
// —> decoder energy (all access types)
//          ( ) per row energy cost
double c_sramModule::getDynEnergyEvent(e_energyEvent p_energyEvent) {
    // compute wordline cap
    m_decoderEnergy = p_sramDecoderFixedEnergy;
    switch(p_energyEvent) {
    case e_enEvIdle:
        m_blineEnergy = 0.0;
        m_senseEnergy = 0.0;
        break;
    case e_enEvRd:
        m_wlineEnergy = (p_sramWLineGateColCap*p_sramActiveCols+p_sramCols*p_sramWLineWireColCap)*m_readWidth*p_vdd*p_vdd;
        m_blineEnergy = ((p_sramReadRowEnergy*m_rows)+p_sramReadFixedEnergy)*m_readWidth*p_sramActiveCols;
        m_senseEnergy = p_sramSenseEnergy*m_readWidth;
        break;
    case e_enEvWr:
        m_wlineEnergy = (p_sramWLineGateColCap*p_sramActiveCols+p_sramCols*p_sramWLineWireColCap)*m_writeWidth*p_vdd*p_vdd;
        m_blineEnergy =((p_sramWriteRowEnergy*m_rows)+p_sramWriteFixedEnergy)*m_writeWidth;
        m_senseEnergy = p_sramWriteDriverEnergy*m_writeWidth;
        break;
    case e_enEvRdWr:
        if (m_readWidth>m_writeWidth) {
            m_wlineEnergy = (p_sramWLineGateColCap*p_sramActiveCols+p_sramCols*p_sramWLineWireColCap)*m_readWidth*p_vdd*p_vdd;
            m_blineEnergy = ((p_sramReadRowEnergy*m_rows)+p_sramReadFixedEnergy)*m_readWidth*p_sramActiveCols;
            m_senseEnergy = p_sramSenseEnergy*m_readWidth;
        }
        else {
            m_wlineEnergy = (p_sramWLineGateColCap*p_sramActiveCols+p_sramCols*p_sramWLineWireColCap)*m_writeWidth*p_vdd*p_vdd;
            m_blineEnergy =((p_sramWriteRowEnergy*m_rows)+p_sramWriteFixedEnergy)*m_writeWidth;
            m_senseEnergy = p_sramWriteDriverEnergy*m_writeWidth;
        }
        break;
    default:
        ASSERT(0,assert::e_warn,"Trying to get dynamic energy for unknown energy event - assuming 0 energy cost!");
        return 0;
    }
    return ((m_blineEnergy+m_decoderEnergy+m_wlineEnergy+m_senseEnergy)*p_sramDynamicAf);
}
uInt64 c_sramModule::estArea( ) {
    // calculate width, height, area
    m_lambdaWidth = (m_width+p_cacheRedundantCols)*p_sramBitCellWidth + p_sramBankDecoderWidth;
    m_lambdaHeight = (m_rows+p_cacheEmulationRows)*p_sramBitCellHeight + p_sramBankColHeight;
    m_lambdaArea = m_lambdaWidth * m_lambdaHeight;
    ASSERT(m_lambdaArea>=0,assert::e_warn,"Negative area estimated in sramModule");
    return m_lambdaArea;
}
```

In the illustrated code embodiment, the base-level SRAM array energy model is configured to receive several parameters, such as SRAM width, the number of rows, read port width, and write port width. The illustrated code embodiment also includes parameter bounds checking that may determine when a supplied parameter is out of range. The illustrated code embodiment provides energy estimates for various types of SRAM array operations, such as idle operation (no operation), array read, array write, and simultaneous array read and write. In the illustrated embodiment, SRAM array energy consumption is modeled as separate components for the array bit line, array word line, sense amplifiers, and bit line/word line decoders. Additionally, the illustrated code embodiment provides a method for estimating SRAM array area. This method may be used for estimating bus lengths by a power model, for example. It is noted that in other embodiments, the base-level SRAM array energy model may receive different numbers and types of parameters, may model different types of SRAM array operations, and may model SRAM array energy consumption using different techniques.

One embodiment of code implementing a base-level bus interconnect energy model may be configured as follows:

out of range. The illustrated bus energy model code embodiment provides energy estimates for various types of bus interconnect, distinguishing between local and global buses and modeling the effect of regularly spaced repeater devices. It is noted that in other embodiments, the base-level bus interconnect energy model may receive different numbers and types of parameters, may model different types of bus interconnect, and may model bus interconnect energy consumption using different techniques.

A base-level standard cell energy model (not shown) may be implemented in a manner similar to that of the models illustrated above. In one embodiment, such a model may include parameters indicating the gate count of the standard cell block as well as the functional type of the standard cell block, such as instruction cache logic or floating point logic, for example. Such an embodiment may provide energy estimates for various operation modes of standard cell logic, such as idle operation and active operation, using activity factors appropriate to each operation mode. It is noted that in other embodiments, the base-level standard cell energy model may receive different numbers and types of parameters and may model standard cell energy consumption using different techniques.

```
//*************************************************************************************************
// Bus energy model
//*************************************************************************************************
c_busModule::c_busModule(const string &x_name, c_physModule *x_par,
            const uInt32 p_bits, const uInt32 p_length,
            e_physSubType p_physSubType) : c_physModule(x_name,
            x_par) {
    // Parameter bounds checking
    ASSERT(p_length>0,assert::e_warn,"bus module " << x_name << " invoked with <0 length");
    ASSERT(p_length<1000000,assert::e_warn,"bus module " << x_name << " invoked with >1,000,000 length");
    ASSERT(p_bits>0,assert::e_warn,"bus module " << x_name << " invoked with <0 bits");
    ASSERT(p_bits<1024,assert::e_warn,"bus module " << x_name << " invoked with >1024 bits");
    m_bits = p_bits;
    m_length = p_length;
    m_physType = e_physTypeBus;
    m_physSubType = p_physSubType;
}
double c_busModule::getDynEnergyEvent(e_energyEvent p_energyEvent) {
    switch(p_energyEvent) {
    case e_enEvActive:
        // bus energy is modeled as 4u/4u (width/spacing) M3 for local buses
        // and 6u/6u M5 for global buses. Repeaters are inserted for every
        // segment.
        m_segments = (uInt32) (floor(m_length/p_busRepeaterFreq));
        if (m_physSubType==e_physSubTypeLocalBus) {
            m_energy = (p_busDynamicAF*m_bits*m_length*p_busLocalCap*p_vdd*p_vdd)+ (m_segments*p_busRepeaterEnergy);
        }
        else if (m_physSubType==e_physSubTypeGlobalBus) {
            m_energy = (p_busDynamicAF*m_bits*m_length*p_busGlobalCap*p_vdd*p_vdd)+ (m_segments*p_busRepeaterEnergy);
        }
        else {
            ASSERT(0,assert::e_warn,"Bus module invoked with invalid energy event");
        }
        break;
    default:
        ASSERT(0,assert::e_warn,"Bus module invoked with invalid energy event");
    }
    return m_energy;
}
```

In the illustrated code embodiment, the base-level bus interconnect energy model is configured to receive several parameters, such as the number of bits and the bus length. Like the base-level SRAM array energy model embodiment illustrated above, the illustrated base-level bus interconnect energy model embodiment also includes parameter bounds checking that may determine when a supplied parameter is Power Model Examples Hierarchical power models may also be defined for the purposes of using methodology 10 of FIG. 1 to model the power consumption of instruction cache 300. As noted above in conjunction with the description of FIG. 1, power models may hierarchically instantiate one or more base-level energy models. In one embodiment, power models may be defined for cache data arrays such as instruction data array 310 and predecode array 360, as well as cache tag arrays such as tag array 340.

One embodiment of code implementing a cache data array power model may be configured as follows:

```
//**********************************************************************
// Cache Data RAM(s) energy and area models
//**********************************************************************
c_cachedataModule::c_cachedataModule(const string &x_name, c_physModule
        *x_par, const uInt32 p_logSize, const uInt32 p_assoc,
        const uInt32 p_logWidth, const uInt32 p_logLineSize) :
        c_physModule(x_name, x_par) {
    // Parameter bounds checking
    ASSERT( (p_logSize>=10)&&(p_logSize<=21),assert::e_warn,
        "cachedataModule model " << x_name << " invoked with size out-of-bounds " << p_logSize);
    ASSERT( (p_assoc==0)||(p_assoc==1)||(p_assoc==2)||(p_assoc==4)||
        (p_assoc==8), assert::e_warn,"cachedataModule model " <<x_name << " invoked with associativity out-of bounds" << p_assoc);
    ASSERT( (p_logWidth>=3)&&(p_logWidth<=7),assert::e_warn,
        "cachedataModule model " << x_name << " invoked with read width out-of-bounds " << p_logWidth);
    ASSERT( (p_logLineSize>=3)&&(p_logLineSize<=8),assert::e_warn,
        "cachedataModule model " << x_name << " invoked with linesize out-of-bounds " << p_logLineSize);
    m_logSize     = p_logSize;             //2^^m_size cache size (bytes)
    m_size        = (uInt32) pow(2,m_logSize);     // cache size (bytes)
    m_assoc       = p_assoc;               // associativity of cache
    m_logLineSize = p_logLineSize;         // 2^^m_linesize linesize (bytes)
    m_lineSize    = (uInt32) pow(2,p_logLineSize);  // linesize (bytes)
    m_logWidth    = p_logWidth;            // 2^^m_width of access (bits)
    m_width       = (uInt32) pow(2,p_logWidth);     // access width (bits)
    m_physType    = e_physTypeCacheData;
    m_physSubType = e_physSubTypeSRAM;
}
void c_cachedataModule::init( ) {
    // ** Construct the Data RAMs
    //
    // 128KBytes and less caches, use the "fast" SRAM configuration
    // (64 rows x 128b)
    if (m_logSize<=17) {
        m_cache[e_physData] = new c_sramModule("cache-Data",this,128,64,64,64);
        m_dataBanks = (uInt32) m_size/1024;
    }
    // bit cache configuration, use the "big" SRAM configuration
    // (128 rows x 128b)
    else {
        m_cache[e_physData] = new c_sramModule("cache-Data",this,128,128,64,64);
        m_dataBanks = (uInt32) m_size/1024;
    }
    m_cache[e_physData]—>init( );
    // **   Construct the buses
    // —>  average bus length is a function of total data area.
    //
    // —>  cache floorplan is assumed to be "low energy" and organized into
    //     banks. Each bank contains a private bus network so that only one
    //     bank needs to be driven per cache access.
    //
    // —>  total bus length is multiplied by p_cache_areafactor to account
    //     for internal bus, clock, power routing, and for the increased
    //     area when the tags are added to the cache module. The cache is
    //     assumed to be square, so that the length of one side is
    //     sqrt(area). Average bus length is approximately 1.625x the
    //     length of one dimension - on average .625 (=4/(4+3+2+1)) for the
    //     column and 1.0 for spine.
    m_avgBusLength = (uInt32) ((sqrt((m_dataBanks*m_cache[e_physData]—>estArea( )))*p_cache_areafactor)*1.625);
    m_indexBits = (uInt32) (m_logSize - m_logLineSize)/m_assoc;
    m_cache[e_physDataBus] = new c_busModule("tlb-DataBus",this,m_width,m_avgBusLength,e_physSubTypeLocalBus);
    m_cache[e_physIndexBus] = new c_busModule("tlb-IndexBus",this,m_indexBits,m_avgBusLength,e_physSubTypeLocalBus);
    m_cache[e_physDataBus]—>init( );
    m_cache[e_physIndexBus]—>init( );
}
double c_cachedataModule::getDynEnergyEvent(e_energyEvent p_energyEvent)
{
    m_energyEvent = p_energyEvent;
    switch(m_energyEvent) {
    // *** linefill accesses - refill the entire line and write the cache.
    case e_enEvCacheLineFill:
        m_beats = (8*m_lineSize)/m_width;
        m_dataEnergy = m_beats*
            m_cache[e_physData]—>getDynEnergyEvent(e_enEvWr);
        m_busEnergy = m_beats*
            (m_cache[e_physDataBus]—>getDynEnergyEvent(e_enEvActive) +
```

```
                m_cache[e_physIndexBus]—>getDynEnergyEvent(e_enEvActive));
            break;
// *** all other accesses (normal reads, writes).
        case e_enEvRd:
        case e_enEvWr:
            m_busEnergy =
                m_cache[e_physDataBus]—>getDynEnergyEvent (e_enEvActive) +
                m_cache[e_physIndexBus]—>getDynEnergyEvent (e_enEvActive);
            m_dataEnergy = m_assoc*
                m_cache[e_physData]—>getDynEnergyEvent(m_energyEvent);
            break;
        default :
            ASSERT(0,assert::e_warn,"Trying to get dynamic energy for unknown energy event - assuming 0 energy cost!");
            return 0;
        }
        return(m_dataEnergy+m_busEnergy);
}
```

In the illustrated code embodiment, the cache data array power model is configured to receive several parameters, such as the cache size, width, and line size (each here represented as a log base 2 quantity) as well as the cache associativity. Like the base-level energy model embodiments illustrated above, the illustrated cache data array power model embodiment also includes parameter bounds checking that may determine when a supplied parameter is out of range. The illustrated cache data array power model embodiment instantiates a base-level SRAM array energy model such as the SRAM array model illustrated above, distinguishing between small and large cache configurations. The illustrated cache data array power model embodiment further instantiates several instances of a base-level bus interconnect energy model such as the bus model illustrated above, distinguishing between data and address index buses and taking into account the area of the circuit represented by the base-level SRAM array energy model. The illustrated cache data array power model embodiment provides energy estimates for various types of cache data array operations, such as cache line fills, cache reads, and cache writes. It is noted that in other embodiments, the cache data array power model may receive different numbers and types of parameters, may instantiate different base-level energy models, and may use different techniques for modeling different types of cache data array operations.

A cache tag array power model (not shown) may be implemented in a manner similar to that of the cache data array power model illustrated above. In one embodiment, such a model may include additional base-level bus interconnect energy models to model cache way selection signals driven to cache data arrays as well as other base-level energy models to model cache tag matching logic. It is noted that in other embodiments, the cache tag array power model may include other types and configurations of base-level energy models and may model different operations.

Mapping File Example

In applying methodology 10 of FIG. 1 to model the power consumption of instruction cache 300, instruction cache-related energy events produced by architecture simulation model 100 may be mapped onto instruction cache-related power models via mapping file 140. One embodiment of mapping file 140 code implementing such a mapping may be configured as follows:

```
# Power model instantiation
power_model macro_instCacheData      [ physTypeCacheData
        logSize=P_ICSIZE assoc=P_ICASSOC logWidth=P_ICFETCHWIDTH
        logLineSize=P_ICLINESIZE ]
power_model macro_pdCacheData        [ physTypeCacheData
        logSize=M_PDSIZE assoc=P_ICASSOC logWidth=M_PDFETCHWIDTH
        logLineSize=M_PDLINESIZE ]
power_model macro_instCacheTag       [ physTypeCacheTag
        logSize=P_ICSIZE assoc=P_ICASSOC logWidth=P_ICFETCHWIDTH
        logLineSize=P_ICLINESIZE ]
power_model stdcell_icLogic          [ physTypeStdCell
        physSubType=GenericCtl gates=P_IF_PWR_ICGATES ]
power_model stdcell_icCtlLogic       [ physTypeStdCell
        physSubType=GenericCtl gates=P_IF_PWR_ICCTLGATES ]
power_model stdcell_tagLogic         [ physTypeStdCell
        physSubType=GenericCtl gates=P_IF_PWR_TAGGATES ]
power_model stdcell_pdCacheLogic     [ physTypeStdCell
        physSubType=GenericCtl gates=P_IF_PWR_PDCGATES ]
# Event mapping
instCacheDataRd    [Instruction Cache Data Array Read]
        powerall    [  [ macro_instCacheData enEvRd ]
                       [ macro_pdCacheData enEvRd ]
                       [ stdcell_pdCacheLogic enEvActive ]
                       [ stdcell_icLogic enEvActive ]
                       [ stdcell_icCtlLogic enEvActive ] ]
```

| | |
|---|---|
| -continued | |
| instCacheDataWr<br>    powerall | [Instruction Cache Data Array Write]<br>  [  [ macro__instCacheData enEvWr ]<br>     [ macro__pdCacheData enEvWr ]<br>     [ stdcell__pdCacheLogic enEvActive ]<br>     [ stdcell__icLogic enEvActive ] ] |
| instCacheTagRd<br>    powerall | [Instruction Cache Tag Array Read]<br>  [  [ macro__instCacheTag enEvMatch ]<br>     [ stdcell__tagLogic enEvActive ] ] |

In the illustrated mapping file code embodiment, power models corresponding to the various circuit elements of FIG. 3 are first instantiated with various parameter definitions. Specifically, cache data array power models such as the model illustrated above are instantiated corresponding to instruction data array 310 and predecode array 360 and are labeled macro_instCacheData and macro_pdCacheData, respectively. A cache tag array power model corresponding to tag array 340 is instantiated and labeled macro_instCacheTag. A base-level standard cell energy model is multiply instantiated as a power model corresponding to each of data array control logic 320, cache control logic 330, tag control logic 350 and predecode control logic 370 and labeled stdcell_icLogic, stdcell_icCtlLogic, stdcell_tagLogic, and stdcell_pdCacheLogic, respectively.

Subsequent to instantiation of power models, the illustrated mapping file code embodiment maps various energy events to the instantiated power models. In this embodiment, three energy events are mapped: an instruction cache data array read event, an instruction cache data array write event, and an instruction cache tag array read event, labeled instCacheDataRd, instCacheDataWr and instCacheTagRd, respectively. In this embodiment, the "powerall" keyword may be used to map a single event to multiple power models; the relevant models are specified along with the specific operating mode to be selected for each power model. For example, the instCacheDataRd event maps to five power models: macro_instCacheData, macro_pdCacheData, stdcell_pdCacheLogic stdcell_icLogic and stdcell_icCtlLogic. A read operation is specified for the two cache power models, and an active operation is specified for the three standard cell logic power models. It is noted that in alternative mapping file embodiments, different numbers and kinds of power models may be instantiated, and different numbers and kinds of energy events may be mapped to one or more power models. It is further noted that in alternative mapping file embodiments, different languages and syntax may be used to establish energy event mapping.

After base-level energy models, power models, and a mapping file such as the embodiments described above have been specified, methodology 10 may be operated as indicated in the description of FIG. 2 to estimate the power consumption of instruction cache 300 with respect to a given application trace. With respect to the illustrated mapping file embodiment, instCacheDataRd, instCacheDataWr and instCacheTagRd energy events produced during a given simulated execution cycle by architecture simulation model 100 may cause the corresponding mapped power models to be evaluated and an instruction cache power estimate to be determined for that execution cycle.

It is noted that all of the preceding code embodiments represent only exemplary embodiments and are not intended to limit the structure or content of such embodiments. Other embodiments are contemplated in which different coding languages or implementation styles may be used. Further, in other embodiments it is contemplated that the base-level energy models and power models may be defined at different levels of abstraction. For example, in one embodiment a cache may be defined as a base-level energy model, while in another embodiment, an array bit cell may be defined as a base-level energy model. Still further, in other embodiments it is contemplated that different behaviors may be modeled by base-level energy models and power models. For example, a given base-level energy model or power model may model a different set of circuit operations and may use different techniques and formulas for estimating energy consumption.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method comprising:
   an architecture simulation model processing an application trace, wherein said architecture simulation model is configured to model operation of an integrated circuit;
   in response to said processing, said architecture simulation model generating a given one of a plurality of energy events, wherein each of said plurality of energy events corresponds to an aspect of the operation of said integrated circuit that consumes energy;
   in response to said generating a given energy event, mapping said given energy event to one or more corresponding ones of a plurality of power models, wherein each of said plurality of power models hierarchically instantiates one or more of a plurality of base-level energy models, and hierarchically evaluating each of said one or more of said corresponding ones of said plurality of power models to identify each instantiated one of said plurality of base-level energy models;
   for each given one of said instantiated ones of said plurality of base-level energy models, evaluating said given instantiated base-level energy model to estimate energy associated with activation of said given instantiated base-level energy model for said given energy event; and
   accumulating said energy in a power estimate corresponding to said given energy event.

2. The method of claim 1, wherein a first subset of said plurality of base-level energy models includes a plurality of parameters configured for selecting physical energy model characteristics.

3. The method of claim 2, wherein at least one of said first subset includes an aspect ratio parameter configured for scaling an energy estimate according to a value of said aspect ratio parameter.

4. The method of claim 1, wherein at least one of said plurality of base-level energy models includes a plurality of parameters configured for selecting microarchitectural energy model characteristics.

5. The method of claim 1, wherein at least one of said plurality of base-level energy models includes a data value parameter configured for scaling an energy estimate according to a value of said data value parameter.

6. The method of claim 1, further comprising deriving a respective energy estimate corresponding to each of a subset of said plurality of base-level energy models from data extracted from a previously completed design.

7. The method of claim 1, wherein at least some of said instantiated ones of said plurality of base-level energy models are configured to estimate static energy consumption associated with said given energy event.

8. A computer-readable medium comprising instructions, wherein the instructions are executable to implement:

an architecture simulation model processing an application trace, wherein said architecture simulation model is configured to model operation of an integrated circuit;

in response to said processing, said architecture simulation model generating a given one of a plurality of energy events, wherein each of said plurality of energy events corresponds to an aspect of the operation of said integrated circuit that consumes energy;

in response to said generating a given energy event, mapping said given energy event to one or more corresponding ones of a plurality of power models, wherein each of said plurality of power models hierarchically instantiates one or more of a plurality of base-level energy models, and hierarchically evaluating each of said one or more of said corresponding ones of said plurality of power models to identify each instantiated one of said plurality of base-level energy models;

for each given one of said instantiated ones of said plurality of base-level energy models, evaluating said given instantiated base-level energy model to estimate energy associated with activation of said given instantiated base-level energy model for said given energy event; and accumulating said energy in a power estimate corresponding to said given energy event.

9. The computer readable medium of claim 8, wherein a first subset of said plurality of base-level energy models includes a plurality of parameters configured for selecting physical energy model characteristics.

10. The computer readable medium of claim 9, wherein at least one of said first subset includes an aspect ratio parameter configured for scaling an energy estimate according to a value of said aspect ratio parameter.

11. The computer readable medium of claim 8, wherein at least one of said plurality of base-level energy models includes a plurality of parameters configured for selecting microarchitectural energy model characteristics.

12. The computer readable medium of claim 8, wherein at least one of said plurality of base-level energy models includes a data value parameter configured for scaling an energy estimate according to a value of said data value parameter.

13. The computer readable medium of claim 8 further comprising deriving a respective energy estimate corresponding to each of a subset of said plurality of base-level energy models from data extracted from a previously completed design.

14. The computer-readable medium of claim 8, wherein at least some of said instantiated ones of said plurality of base-level energy models are configured to estimate static energy consumption associated with said given energy event.

15. A system comprising:

an architecture simulation model, wherein said architecture simulation model is configured to model operation of an integrated circuit;

a plurality of base-level energy models; and a plurality of power models each configured to hierarchically instantiate one or more of said plurality of base-level energy models;

wherein said architecture simulation model is further configured to:

process an application trace;

in response to said processing, generate a given one of a plurality of energy events, wherein each of said plurality of energy events corresponds to an aspect of the operation of said integrated circuit that consumes energy;

in response to said generating a given energy event, map said given energy event to one or more corresponding ones of said plurality of power models and hierarchically evaluate each of said one or more of said corresponding ones of said plurality of power models to identify each instantiated one of said plurality of base-level energy models;

for each given one of said instantiated ones of said plurality of base-level energy models, evaluate said given instantiated base-level energy model to estimate energy associated with activation of said given instantiated base-level energy model for said given energy event; and accumulate said energy in a power estimate corresponding to said given energy event.

16. The system of claim 15, wherein a first subset of said plurality of base-level energy models includes a plurality of parameters configured for selecting physical energy model characteristics.

17. The system of claim 16, wherein at least one of said first subset includes an aspect ratio parameter configured for scaling an energy estimate according to a value of said aspect ratio parameter.

18. The system of claim 15, wherein at least one of said plurality of base-level energy models includes a plurality of parameters configured for selecting microarchitectural energy model characteristics.

19. The system of claim 15, wherein at least one of said plurality of base-level energy models includes a data value parameter configured for scaling an energy estimate according to a value of said data value parameter.

20. The system of claim 15, wherein a respective energy estimate corresponding to each of a subset of said plurality of base-level energy models is derived from data extracted from a previously completed design.

21. The system of claim 15, wherein at least some of said instantiated ones of said plurality of base-level energy models are configured to estimate static energy consumption associated with said given energy event.

* * * * *